US012789171B2

(12) United States Patent
Nishio et al.

(10) Patent No.: US 12,789,171 B2
(45) Date of Patent: Nov. 10, 2026

(54) EXHAUST GAS PURIFICATION CATALYST

(71) Applicants: Takahiro Nishio, Nagoya (JP); Nobuyuki Takagi, Nagoya (JP); Takumi Tojo, Tajimi (JP); Shogo Shirakawa, Toyota (JP); Kengo Shimizu, Iwata (JP); Sho Hoshino, Hamamatsu (JP); Shun Sakamoto, Iwata (JP); Yosuke Toda, Iwata (JP)

(72) Inventors: Takahiro Nishio, Nagoya (JP); Nobuyuki Takagi, Nagoya (JP); Takumi Tojo, Tajimi (JP); Shogo Shirakawa, Toyota (JP); Kengo Shimizu, Iwata (JP); Sho Hoshino, Hamamatsu (JP); Shun Sakamoto, Iwata (JP); Yosuke Toda, Iwata (JP)

(73) Assignees: TOYOTA JIDOSHA KABUSHIKI KAISHA, Toyota (JP); CATALER CORPORATION, Kakegawa (JP)

( * ) Notice: Subject to any disclaimer, the term of this patent is extended or adjusted under 35 U.S.C. 154(b) by 451 days.

(21) Appl. No.: 18/488,353

(22) Filed: Oct. 17, 2023

(65) Prior Publication Data

US 2024/0139716 A1 May 2, 2024

(30) Foreign Application Priority Data

Oct. 28, 2022 (JP) ................................ 2022-173395

(51) Int. Cl.
*B01J 23/56* (2006.01)

(52) U.S. Cl.
CPC .......... *B01J 23/56* (2013.01); *B01J 2523/822* (2013.01); *B01J 2523/824* (2013.01); *B01J 2523/828* (2013.01)

(58) Field of Classification Search
CPC .......................... B01J 23/56; B01J 2523/822; B01J 2523/824; B01J 2523/828
(Continued)

(56) References Cited

U.S. PATENT DOCUMENTS

2010/0150792 A1* 6/2010 Kitamura ............ B01J 37/0244 422/180
2016/0199812 A1 7/2016 Aoki
(Continued)

FOREIGN PATENT DOCUMENTS

CN 105492107 A 4/2016
CN 113042042 A 6/2021
(Continued)

*Primary Examiner* — Patricia L. Hailey
(74) *Attorney, Agent, or Firm* — Sughrue Mion, PLLC

(57) ABSTRACT

Provided is an exhaust gas purification catalyst providing a catalyst performance and an OSC performance at the same time even at low temperature. The present disclosure relates to an exhaust gas purification catalyst including a substrate and a catalyst coating layer coated on the substrate. The catalyst coating layer includes a first catalyst coating layer containing Pd and/or Pt and a second catalyst coating layer containing Rh. The first catalyst coating layer is formed from an end portion in an upstream side with respect to an exhaust gas flow direction in the exhaust gas purification catalyst. The second catalyst coating layer includes an upstream coating layer and a downstream coating layer. Rh in the upstream coating layer and the downstream coating layer are supported on specific carrier particles. Further, a particle diameter of Rh is controlled.

4 Claims, 2 Drawing Sheets

(58) Field of Classification Search
USPC ........................................................ 502/339
See application file for complete search history.

(56) References Cited

U.S. PATENT DOCUMENTS

| | | | |
|---|---|---|---|
| 2017/0296968 | A1 | 10/2017 | Yoshida et al. |
| 2021/0197175 | A1 | 7/2021 | Nishio et al. |
| 2021/0197176 | A1 | 7/2021 | Chinzei et al. |
| 2022/0134313 | A1 | 5/2022 | Nihashi et al. |

FOREIGN PATENT DOCUMENTS

| | | | | | |
|---|---|---|---|---|---|
| JP | 2017-189745 | A | | 10/2017 | |
| JP | 2018-038999 | A | | 3/2018 | |
| JP | 2020032306 | A | * | 3/2020 | ............ B01D 53/94 |
| JP | 2020-131086 | A | | 8/2020 | |
| JP | 2021-104472 | A | | 7/2021 | |
| WO | 2020175142 | A1 | | 9/2020 | |
| WO | 2022/056066 | A1 | | 3/2022 | |

* cited by examiner

EXHAUST GAS PURIFICATION CATALYST

CROSS REFERENCE TO RELATED APPLICATIONS

The present application claims priority from Japanese patent application JP 2022-173395 filed on Oct. 28, 2022, the entire content of which is hereby incorporated by reference into this application.

BACKGROUND

Technical Field

The present disclosure relates to an exhaust gas purification catalyst.

Description of Related Art

In exhaust gas discharged from internal combustion engines for automobiles and the like, for example, internal combustion engines, such as gasoline engines or diesel engines, harmful components, for example, carbon monoxide (CO), hydrocarbons (HC), and nitrogen oxides (NOx) are contained.

Therefore, in general, an exhaust gas cleaning device for decomposing and removing the harmful components is provided in the internal combustion engines, and an exhaust gas purification catalyst mounted in the exhaust gas cleaning device detoxifies most of the harmful components. As such an exhaust gas purification catalyst, for example, a three-way catalyst or a NOx storage reduction catalyst is known.

The three-way catalyst is a catalyst that oxidizes CO and HC and reduces NOx at the same time in a stoichiometric (theoretical air-fuel ratio) atmosphere.

The NOx storage reduction catalyst is a catalyst that oxidizes NO in exhaust gas into $NO_2$ in a lean atmosphere, stores $NO_2$, and reduces $NO_2$ into nitrogen ($N_2$) in a stoichiometric atmosphere and a rich atmosphere. In the NOx storage reduction catalyst, a change in exhaust gas components in the lean atmosphere, the stoichiometric atmosphere, and the rich atmosphere is skillfully used.

However, even in the case of employing this catalyst, a problem still remains with the cleaning of exhaust gas, and a variety of studies are underway.

For example, JP 2017-189745 A discloses a catalytic converter that includes a substrate that has a cell structure through which an exhaust gas flows and a catalyst layer formed on a cell wall surface of the substrate. In JP 2017-189745 A, the catalyst layer includes an upstream catalyst layer containing Rh disposed on an upstream side in an exhaust gas flow direction and a downstream catalyst layer containing Pd or Pt disposed on a downstream side in the exhaust gas flow direction of the substrate. A carrier supporting Rh in the upstream catalyst layer is specified by an $Al_2O_3$—$CeO_2$—$ZrO_2$ ternary composite oxide and/or an $Al_2O_3$—$ZrO_2$ binary composite oxide.

JP 2020-131086 A discloses an exhaust gas purification catalyst that includes a substrate and a catalyst coating layer coated over the substrate. In JP 2020-131086 A, the catalyst coating layer includes an upstream coating layer that contains an OSC material and composite metal microparticles containing Rh and Pd, and a downstream coating layer containing Rh. The amount of Rh contained in the composite metal microparticles containing Rh and Pd is specified. Furthermore, for the composite metal microparticles containing Rh and Pd, a mean of Pd relative to the sum of Rh and Pd in atomic percentage and a standard deviation on a variation of Pd relative to the sum of Rh and Pd in atomic percentage are specified.

WO 2020/175142 A1 discloses a supported catalyst particle containing an oxide carrier particle and noble metal particles supported on the oxide carrier particle. In WO 2020/175142 A1, a mass of the noble metal particles is specified, and a mean particle size of the noble metal particles and its standard deviation 6 are specified.

SUMMARY

An amount of noble metal used for an exhaust gas purification catalyst is required to be reduced from an aspect of resource risk. In order to reduce the amount of the noble metal, it is desired to suppress a decrease in catalytic activity of the noble metal caused by the use of the exhaust gas purification catalyst.

Meanwhile, a catalyst coating layer may include a material having an oxygen storage capacity (OSC) (OSC material) in addition to the catalytic metal. The OSC material is a material that can absorb and release oxygen. The OSC material allows keeping an oxygen concentration constant to maintain a purification performance (catalyst performance) of the exhaust gas purification catalyst even when an air-fuel ratio varies.

That is, as an exhaust gas purification catalyst, an exhaust gas purification catalyst that provides the catalyst performance and the OSC performance at the same time (that strikes a balance between the catalyst performance and the OSC performance) is desired.

Furthermore, recently, providing the catalyst performance and the OSC performance at the same time as described above is required even in a low temperature operation, for example, immediately after engine start.

Accordingly, the present disclosure provides an exhaust gas purification catalyst providing a catalyst performance and an OSC performance at the same time even at low temperature.

Conversion of NOx in an exhaust gas purification catalyst is performed by especially rhodium (Rh) among noble metals. Therefore, for the satisfactory NOx conversion performance, it is important to ensure the catalyst performance of Rh.

Meanwhile, the OSC performance in an exhaust gas purification catalyst is ensured by an OSC material. Furthermore, the OSC performance at low temperature in an exhaust gas purification catalyst is expressed by not only the OSC material but also ensuring an inlet/outlet of oxygen via a noble metal, for example, Rh.

However, due to the property of absorbing and releasing oxygen, the OSC material may cause a delay in a state change or a deterioration of the catalyst performance of a noble metal by getting close to the noble metal. That is, when Rh is in proximity to the OSC material, the deterioration of Rh reducibility or the increase in stable particle diameter of Rh particle is caused, and consequently, the conversion performance is deteriorated.

Accordingly, supporting Rh on a zirconia ($ZrO_2$)-based carrier for ensuring the catalyst performance of Rh deteriorates the OSC performance at low temperature. Meanwhile, supporting Rh on an OSC material for ensuring the OSC performance at low temperature deteriorates the catalyst performance of Rh.

Therefore, the inventors examined various means to solve the above-described problem. As a result, the inventors found that the catalyst performance and the OSC performance are provided at the same time even at low temperature by adjusting an exhaust gas purification catalyst including a substrate and a catalyst coating layer coated over the substrate as (i) to (ix) below, and achieved the present disclosure.

(i) A first catalyst coating layer containing Pd and/or Pt, which is a noble metal, as a catalyst metal is disposed on a substrate.

(ii) The first catalyst coating layer is formed from an end portion in an upstream side with respect to an exhaust gas flow direction in the exhaust gas purification catalyst.

(iii) A second catalyst coating layer containing Rh, which is a noble metal, as a catalyst metal is disposed on or under the first catalyst coating layer.

(iv) The second catalyst coating layer includes an upstream coating layer and a downstream coating layer. The upstream coating layer is formed from the end portion in the upstream side with respect to the exhaust gas flow direction in the exhaust gas purification catalyst. The downstream coating layer is formed from an end portion in a downstream side with respect to the exhaust gas flow direction in the exhaust gas purification catalyst.

(v) The upstream coating layer includes particles in which Rh is supported on an OSC material. Here, a support amount of Rh on the OSC material is 20 weight % (% by weight) or more relative to a total weight of the whole of Rh present in the upstream coating layer.

(vi) The downstream coating layer includes particles in which Rh is supported on a $ZrO_2$-containing composite oxide selected from zirconia, an alumina-zirconia-based composite oxide (AZ), and an alumina-zirconia-titanium-based composite oxide (AZT).

(vii) A mean particle diameter of Rh is 1.0 nm to 2.0 nm with a standard deviation a of 0.8 nm or less in a measurement by a transmission electron microscope observation.

(viii) In one embodiment, a weight ratio of Rh between the upstream coating layer and the downstream coating layer (Rh amount in upstream coating layer:Rh amount in downstream coating layer) is adjusted to from 1:1 to 1:4.

(ix) In one embodiment, the upstream coating layer and the downstream coating layer are adjusted to have mutually overlapping regions.

The present disclosure provides the exhaust gas purification catalyst providing the catalyst performance and the OSC performance at the same time even at low temperature.

DETAILED DESCRIPTION OF THE EMBODIMENTS

Figure 1:
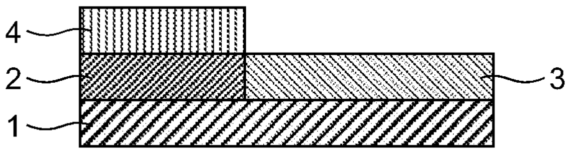
FIG. 1 is a drawing schematically illustrating an example of an embodiment of the present disclosure.

The following describes some embodiments of the present disclosure in detail.

In the description, features of the present disclosure will be described with reference to the drawings as necessary. In the drawings, dimensions and shapes of respective components are exaggerated for clarification, and actual dimensions and shapes are not accurately illustrated. Accordingly, the technical scope of the present disclosure is not limited to the dimensions or the shapes of respective components illustrated in the drawings. Note that, an exhaust gas purification catalyst of the present disclosure is not limited to the embodiments bellow, and can be performed in various configurations where changes, improvements, and the like which a person skilled in the art can make are given without departing from the gist of the present disclosure.

(Substrate)

As the substrate, a known substrate having a honeycomb shape is usable, specifically, a monolith substrate having a honeycomb shape (for example, a honeycomb filter and a high-density honeycomb) and the like are employed in some embodiments. The material of such a substrate is not limited. Examples of a material of the substrate include a substrate made of ceramic, such as cordierite, silicon carbide (SiC), silica ($SiO_2$), alumina ($Al_2O_3$), and mullite, and a substrate made of metal, such as stainless-steel including chromium and aluminum. Among these, the cordierite is used in some embodiments from the aspect of cost.

(Catalyst Coating Layer)

A catalyst coating layer includes at least a first catalyst coating layer containing Pd and/or Pt as a catalyst metal and a second catalyst coating layer containing Rh as a catalyst metal.

The first catalyst coating layer is formed from an end portion (end surface) in an upstream side (inflow side of an exhaust gas) with respect to an exhaust gas flow direction of the exhaust gas purification catalyst.

The above-described configuration of the first catalyst coating layer allows efficiently converting harmful components, especially HC, in the exhaust gas that has flowed therein.

The second catalyst coating layer includes an upstream coating layer formed from the end portion in the upstream side with respect to the exhaust gas flow direction of the exhaust gas purification catalyst, and a downstream coating layer formed from an end portion (end surface) in a downstream side (outflow side of the exhaust gas) with respect to the exhaust gas flow direction of the exhaust gas purification catalyst.

The first catalyst coating layer has a width of usually 20% to 50%, 20% to 35% in one embodiment, of the whole length of the substrate in the exhaust gas purification catalyst.

The width of the first catalyst coating layer within the range enables to improve a contact frequency of Pd, Pt with a harmful component in the exhaust gas, such as HC while suppressing an aggregation between the catalytic metals caused by an excessively short width, for example, an aggregation of Pd and Pt caused by a densification of Pd and Pt, and thus enabling an improved exhaust gas purification performance.

The upstream coating layer has a width of usually 30% to 70%, 30% to 60% in one embodiment, of the whole length of the substrate in the exhaust gas purification catalyst.

The downstream coating layer has a width of usually 30% to 70%, 30% to 60% in one embodiment, of the whole length of the substrate in the exhaust gas purification catalyst.

The widths of the upstream coating layer and the downstream coating layer within the ranges enable to improve a contact frequency of Rh with a harmful component in the exhaust gas, such as NOx while suppressing an aggregation between the catalytic metals caused by an excessively short width, for example, an aggregation of Rh caused by a densification of Rh, and thus enabling an improved exhaust gas purification performance.

The first catalyst coating layer may be disposed on the upstream coating layer.

The first catalyst coating layer disposed on the upstream coating layer enables to convert the harmful component, especially NOx by Rh contained in the upstream coating layer after converting the harmful component, especially HC in the exhaust gas that has flowed therein by Pd, Pt contained in the first catalyst coating layer.

The first catalyst coating layer may be disposed under the upstream coating layer.

The first catalyst coating layer disposed under the upstream coating layer, for example, enables to convert NOx by Rh while avoiding oxidation of ammonia ($NH_3$) to nitrous oxide ($N_2O$) by Pd, Pt immediately after engine start.

The upstream coating layer and the downstream coating layer may form a single layer together on the whole of the substrate.

The upstream coating layer may be overlapped with the downstream coating layer. When the upstream coating layer is overlapped with the downstream coating layer, in the overlapping portion, the upstream coating layer may be disposed on the downstream coating layer. When the upstream coating layer is overlapped with the downstream coating layer, in the overlapping portion, the upstream coating layer may be disposed under the downstream coating layer. When the upstream coating layer is overlapped with the downstream coating layer, in the overlapping portion, the mutually overlapping region of the upstream coating layer and the downstream coating layer has a lap width of usually 5% to 30% of the whole length of the substrate in the exhaust gas purification catalyst.

When the upstream coating layer is overlapped with the downstream coating layer, in the overlapping portion, the upstream coating layer is disposed on the downstream coating layer in some embodiments.

The upstream coating layer is disposed on the downstream coating layer, thereby introducing the exhaust gas into the downstream coating layer after atmosphere buffering by the upstream coating layer. As the result, the downstream coating layer can be utilized more effectively.

The second catalyst coating layer having the above-described configuration enables to perform efficient exhaust gas purification especially when, in a two-catalyst system that includes a start-up catalyst (also referred to as S/C, start-up converter, and the like) and an underfloor catalyst (also referred to as UF/C, underfloor converter, underfloor catalyst, and the like), the exhaust gas purification catalyst is used as the S/C, even in an atmosphere where a high-concentration exhaust gas may be present at low temperature immediately after engine start and the like.

FIG. 1 illustrates an example of the embodiment according to the present disclosure.

The exhaust gas purification catalyst of one embodiment of the present disclosure illustrated in FIG. 1 includes a substrate 1 and catalyst coating layers 2 to 4 coated on the substrate 1. The catalyst coating layers 2 to 4 are made of a second catalyst coating layer 2 and 3 and a first catalyst coating layer 4. The second catalyst coating layer 2 and 3 have an upstream coating layer 2 and a downstream coating layer 3 that are disposed on the substrate 1. The upstream coating layer 2 is formed from an end portion in an upstream side with respect to an exhaust gas flow direction in the exhaust gas purification catalyst. The downstream coating layer 3 is formed from an end portion in a downstream side with respect to the exhaust gas flow direction in the exhaust gas purification catalyst. Here, the upstream coating layer 2 and the downstream coating layer 3 form a single layer together on the whole substrate 1. The first catalyst coating layer 4 is disposed on the upstream coating layer 2 in the second catalyst coating layer 2 and 3 and formed from the end portion in the upstream side with respect to the exhaust gas flow direction in the exhaust gas purification catalyst. Here, the first catalyst coating layer 4 has a width the same as the width of the upstream coating layer 2.

In the exhaust gas purification catalyst of the one embodiment of the present disclosure illustrated in FIG. 1, since the upstream coating layer 2 is covered with the first catalyst coating layer 4, the contact frequency of the exhaust gas with the upstream coating layer 2 decreases, and the atmosphere buffering capacity of the upstream coating layer 2 decreases. Meanwhile, since a lap portion of the upstream coating layer 2 and the downstream coating layer 3 is not present, an effective use of Rh can be realized. Accordingly, the exhaust gas purification catalyst can achieve a purification performance and an OSC performance in a compatible manner.

Since the catalyst coating layer includes the first catalyst coating layer and the second catalyst coating layer, HC conversion in the first catalyst coating layer and NOx conversion in the second catalyst coating layer can be efficiently performed.

(First Catalyst Coating Layer)

The first catalyst coating layer contains Pd and/or Pt as a catalyst metal.

The content of Pd and/or Pt contained in the first catalyst coating layer is not limited, but is usually 0.2 g to 10 g, 0.5 g to 7.0 g in one embodiment, in a catalyst metal conversion (in terms of metal of Pd and/or Pt) with respect to 1 L of a capacity of a portion where the first catalyst coating layer is applied on the substrate. Note that the content of the component contained in the exhaust gas purification catalyst depends on an additive amount of a material at the production of the exhaust gas purification catalyst (excluding components to be volatilized), and its explanation will be omitted below.

The inclusion of Pd and/or Pt in the first catalyst coating layer, that is, disposing the first catalyst coating layer including Pd and/or Pt in the upstream side, that is, in the front portion of the exhaust gas purification catalyst improves a conversion performance of the exhaust gas, in particular, HC, by improved ignitability caused by the densification of Pd and Pt. Pd and/or Pt are low-price with respect to Rh, and effective to a low-temperature oxidation reaction.

The coat amount of the first catalyst coating layer is not limited, but is usually 40 g to 200 g, 70 g to 200 g in one embodiment, with respect to 1 L of the capacity of the portion where the first catalyst coating layer is applied on the substrate.

The thickness of the first catalyst coating layer is not limited, but is usually 5 μm to 50 μm, 10 μm to 30 μm in one embodiment, in an average thickness. The thickness of the first catalyst coating layer can be measured by, for example, a scanning electron microscope (SEM).

The amount of each material in the first catalyst coating layer and the thickness of the first catalyst coating layer within the ranges enable to properly keep a balance among a pressure loss, a catalyst performance, and durability in the exhaust gas purification catalyst.

(Second Catalyst Coating Layer)

The content of Rh contained in the second catalyst coating layer is not limited, but is usually 0.10 g to 2.0 g, 0.3 g to 1.6 g in one embodiment, in a catalyst metal conversion (in terms of metal of Rh) with respect to 1 L of a capacity of a portion where the second catalyst coating layer is applied on the substrate.

The content of Rh contained in the upstream coating layer is not limited, but is usually 0.05 g to 1.0 g, 0.1 g to 0.8 g in one embodiment, in a catalyst metal conversion (in terms of metal of Rh) with respect to 1 L of a capacity of a portion where the upstream coating layer is applied on the substrate.

The inclusion of the content of Rh in the upstream coating layer enables to sufficiently provide a NOx conversion performance without HC poisoning of Rh under the atmosphere where HC is sufficiently converted by the first catalyst coating layer when the upstream coating layer is disposed under the first catalyst coating layer. The inclusion of the content of Rh in the upstream coating layer enables to convert NOx by Rh before oxidation of ammonia ($NH_3$) to nitrous oxide ($N_2O$) by Pd and Pt immediately after engine start when the upstream coating layer is disposed on the first catalyst coating layer.

The content of Rh contained in the downstream coating layer is not limited, but is usually 0.05 g to 1.0 g, 0.2 g to 0.8 g in one embodiment, in a catalyst metal conversion (in terms of metal of Rh) with respect to 1 L of a capacity of a portion where the downstream coating layer is applied on the substrate.

The inclusion of the content of Rh in the downstream coating layer enables to sufficiently provide a NOx conversion performance without HC poisoning of Rh under the atmosphere where HC is sufficiently converted by the first catalyst coating layer that exists in the upstream side.

In one embodiment, the content of Rh contained in the downstream coating layer is high compared with the content of Rh contained in the upstream coating layer.

A weight ratio of Rh between the upstream coating layer and the downstream coating layer (Rh amount in upstream coating layer:Rh amount in downstream coating layer) is usually 1:1 to 1:4.

The Rh content in the downstream coating layer higher than the Rh content in the upstream coating layer enables more effective use of the downstream coating layer that easily becomes low temperature compared with the upstream coating layer.

A part of or the whole of Rh contained in the upstream coating layer is supported on an OSC material.

Accordingly, the upstream coating layer further contains the OSC material. The OSC material is not limited insofar as the OSC material has an OSC performance. Examples of the OSC material include ceria, an alumina-ceria-zirconia-based composite oxide (ACZ), a ceria-zirconia-based composite oxide (CZ), and a combination of two or more of them. For compositions (combined amounts) of the respective oxides in the OSC material, those known in the technical field can be used.

In the upstream coating layer, the Rh support amount on the OSC material is 20 weight % or more relative to the total weight of the whole Rh present in the upstream coating layer. The upper limit value of the Rh support amount on the OSC material is not limited because the whole of Rh may be supported on the OSC material. Note that Rh that is not supported on the OSC material is supported on a material without OSC performance: for example, a metal oxide, such as silica, magnesium oxide, zirconia, alumina, titania, yttria, neodymium oxide, lanthanum oxide, and a composite oxide or a solid solution thereof; for example, an alumina-zirconia-based composite oxide (AZ); a combination of two or more of them and the like.

The whole of Rh contained in the downstream coating layer is supported on a $ZrO_2$-containing composite oxide selected from zirconia, an alumina-zirconia-based composite oxide (AZ), and an alumina-zirconia-titanium-based composite oxide (AZT), which are materials without OSC performance.

Accordingly, the downstream coating layer further contains the $ZrO_2$-containing composite oxide selected from zirconia, an alumina-zirconia-based composite oxide (AZ), and an alumina-zirconia-titanium-based composite oxide (AZT).

The contents of the carrier particles (OSC material or $ZrO_2$-containing composite oxide) in the upstream coating layer and the downstream coating layer are adjusted in a manner in which the Rh content usually becomes 5.0 weight % or less, for example, 0.2 weight % to 5.0 weight % relative to the total weight of the carrier particles. For example, the content of the OSC material in the upstream coating layer is usually 20 g to 100 g, 40 g to 100 g in one embodiment, with respect to 1 L of a capacity of a portion where the upstream coating layer is applied on the substrate. For example, the content of the $ZrO_2$-containing composite oxide in the downstream coating layer is usually 30 g to 200 g, 40 g to 200 g in one embodiment, 50 g to 200 g in one embodiment, and 50 g to 150 g in one embodiment, with respect to 1 L of a capacity of a portion where the downstream coating layer is applied on the substrate.

The mean particle diameter of Rh is 1.0 nm to 2.0 nm, 1.2 nm to 1.8 nm in one embodiment, with standard deviation $\sigma$ of 0.8 nm or less, 0.2 nm to 0.7 nm in one embodiment, in the measurement by TEM observation.

For Rh particles, the proportion of the fine particles of less than 1.0 nm is especially reduced. The content of Rh fine particles having the particle diameter of less than 1.0 nm is usually 5 weight % or less, 1 weight % or less in one embodiment, relative to the total weight of Rh. The small proportion of the fine particles having the particle diameter of less than 1.0 nm suppresses the aggregation between Rh particles during the catalytic reaction. Accordingly, high activation of Rh particles can be maintained over a long period of time.

The method for producing a dispersion of Rh particles and a method for supporting Rh particles on carrier particles are disclosed in, for example, WO 2020/175142 A1.

For example, the dispersion of Rh particles can be produced by two methods below.

(Method 1) A method comprising reacting an acidic solution of a noble metal compound with a basic solution in a reactor in which a clearance of a reaction field is set in a predetermined range.

(Method 2) A method comprising mixing an acidic solution of a noble metal compound and a basic solution to react, and subsequently performing a stirring process in a high speed mixer.

The obtained dispersion of Rh particles is brought in contact with carrier particles, and then fired, thereby enabling obtaining the carrier particles on which fine Rh particles are supported.

Fine Rh particles supported on the carrier particles enable ensuring the outlet/inlet of oxygen via Rh, that is, ensuring the OSC performance at low temperature while increasing the contact surface between the exhaust gas and Rh.

The coat amount of the upstream coating layer is not limited, but is usually 30 g to 250 g, 50 g to 250 g in one embodiment, with respect to 1 L of the capacity of the portion where the upstream coating layer is applied on the substrate.

The coat amount of the downstream coating layer is not limited, but is usually 50 g to 250 g, 100 g to 250 g in one embodiment, with respect to 1 L of the capacity of the portion where the downstream coating layer is applied on the substrate.

The thickness of the upstream coating layer is not limited, but is usually 5 μm to 50 μm, 10 μm to 30 μm in one embodiment, in an average thickness. The thickness of the upstream coating layer can be measured by, for example, SEM.

The thickness of the downstream coating layer is not limited, but is usually 5 μm to 50 μm, 10 μm to 30 μm in one embodiment, in an average thickness. The thickness of the downstream coating layer can be measured by, for example, SEM.

The amounts of the respective materials in the upstream coating layer and the downstream coating layer and the thicknesses of the upstream coating layer and the downstream coating layer within the ranges enable to properly keep a balance among a pressure loss, a catalyst performance, and durability in the exhaust gas purification catalyst.

(Method for Producing Exhaust Gas Purification Catalyst)

The exhaust gas purification catalyst of the present disclosure can be produced using a known coating technique except that the constituent components of the exhaust gas purification catalyst described above are used.

For example, the exhaust gas purification catalyst of the present disclosure having a substrate and a catalyst coating layer, which includes a first catalyst coating layer and a second catalyst coating layer, coated on the substrate can be produced by the following method. The method includes (i) a step of preparing a first catalyst coating layer slurry including a catalyst metal precursor containing Pd and/or Pt and a solvent, (ii) a step of preparing a second catalyst coating layer slurry including a Rh dispersion containing Rh, carrier particles, and a solvent, (iii) a step of applying the first catalyst coating layer slurry prepared in the step (i) from an end portion in an upstream side with respect to an exhaust gas flow direction in the exhaust gas purification catalyst to form the first catalyst coating layer, and (iv) a step of applying the second catalyst coating layer slurry prepared in the step (ii) to form the second catalyst coating layer.

Here, the respective materials are as described above.

In the present disclosure, the step (ii) includes, as the step of preparing the second catalyst coating layer slurry, (ii-1) a step of preparing a slurry for a downstream coating layer to be formed from an end portion in a downstream side with respect to the exhaust gas flow direction in the exhaust gas purification catalyst, and (ii-2) a step of preparing a slurry for an upstream coating layer to be formed from the end portion in the upstream side with respect to the exhaust gas flow direction in the exhaust gas purification catalyst. Furthermore, the step (iv) includes, as the step of forming the second catalyst coating layer, (iv-1) a step of applying the slurry for the downstream coating layer prepared in the step (ii-1) to form the downstream coating layer, and (iv-2) a step of applying the slurry for the upstream coating layer prepared in the step (ii-2) to form the upstream coating layer. Note that the step sequence of (i) to (iv) is not limited as long as the step (iii) is performed after the step (i), the step (iv-1) is performed after the step (ii-1), and the step (iv-2) is performed after the step (ii-2).

(Application of Exhaust Gas Purification Catalyst)

The exhaust gas purification catalyst of the present disclosure can significantly provide the effect in an exhaust gas purification performance at low temperature and in the rich atmosphere, and can be used as an exhaust gas purification catalyst that develops a high HC poisoning suppression effect usable even under an environment where the exhaust gas purification catalyst is possibly poisoned due to that the excess HC and the like are attached to the exhaust gas purification catalyst at low temperature and in the rich atmosphere.

For example, the exhaust gas purification catalyst of the present disclosure can be used as the S/C in a two-catalyst system that includes S/C and UF/C.

EXAMPLES

While the following describes some Examples regarding the present disclosure, it is not intended to limit the present disclosure to those described in such Examples.

1. Used Material

- Material 1 ($Al_2O_3$): $La_2O_3$ composite $Al_2O_3$($Al_2O_3$: 99 weight %) ($La_2O_3$: 1 weight %)
- Material 2 (ACZ): $Al_2O_3$—$CeO_2$—$ZrO_2$-based composite oxide (ACZ) ($Al_2O_3$: 30 weight %) ($CeO_2$: 20 weight %) ($ZrO_2$: 44 weight %) ($Nd_2O_3$: 2 weight %) ($La_2O_3$: 2 weight %) ($Y_2O_3$: 2 weight %)
- Material 3 (AZ): $Al_2O_3$—$ZrO_2$-based composite oxide (AZ) ($Al_2O_3$: 30 weight %) ($ZrO_2$: 60 weight %) ($La_2O_3$: 5 weight %) ($Y_2O_3$: 5 weight %)
- Material 4 (CZ): $CeO_2$—$ZrO_2$-based composite oxide having a pyrochlore structure ($Ce_2Zr_2O_7$) ($CeO_2$: 51.5 weight %) ($ZrO_2$: 45.5 weight %) ($Pr_6O_{11}$: 3 weight %) (prepared based on JP 2018-038999 A)
- Material 5 (Ba): Barium sulfate
- Material 6 (Rh): Rhodium nitrate aqueous solution (Rh concentration: 2.75 weight %)
- Material 7 (Particle size-controlled Rh): Rhodium nitrate aqueous solution (Rh concentration: 1.00 weight %) (prepared based on WO 2020/175142 A1)
- Material 8 (Pd): Palladium nitrate aqueous solution (Pd concentration: 8.40 weight %)
- Substrate: Cordierite honeycomb substrate of 875 cc (600 cell hexagons, wall thickness of 2 mil, whole length of 105 mm)

2. Production of Exhaust Gas Purification Catalyst

Comparative Example 1

First, Material 6 (Rh) and Material 3 (AZ) were introduced into distilled water while being stirred, and the obtained suspension was dried at 120° C. for two hours and further fired at 500° C. for two hours to prepare AZ on which Rh was supported (Rh/AZ).

Next, Rh/AZ, Material 1 ($Al_2O_3$), Material 2 (ACZ), Material 4 (CZ), and $Al_2O_3$-based binder were introduced into distilled water while being stirred to prepare a suspended slurry 1.

Subsequently, the prepared slurry 1 was casted to the substrate and the excess was blown off with a blower, and thus, the wall surface of the substrate was coated with the material and a precursor layer of an upstream coating layer was prepared. At this time, for the respective coating materials, with respect to 1 L of a capacity of a portion where the upstream coating layer was applied on the substrate, the contents of the respective coating materials were set in such a way that Material 6 became 0.25 g in a metal conversion of Rh (0.25 g/L-zone), Material 1 became 20 g (20 g/L-zone), Material 2 became 40 g (40 g/L-zone), Material 3 became 20 g (20 g/L-zone), and Material 4 became 10 g (10 g/L-zone). The coat length of the precursor layer of the upstream coating layer was adjusted to occupy 50% of the whole length of the substrate in an exhaust gas purification catalyst from an end portion in an upstream side with respect to an exhaust gas flow direction in the exhaust gas purification catalyst.

Finally, after the water content was reduced for two hours with a dryer kept at 120° C., firing was performed for two hours with an electric furnace kept at 500° C. to prepare the upstream coating layer (front portion).

Subsequently, Material 6 (Rh) and Material 3 (AZ) were introduced into distilled water while being stirred, and the obtained suspension was dried at 120° C. for two hours and further fired at 500° C. for two hours to prepare AZ on which Rh was supported (Rh/AZ).

Next, Rh/AZ, Material 1 ($Al_2O_3$), Material 2 (ACZ), Material 4 (CZ), and $Al_2O_3$-based binder were introduced into distilled water while being stirred to prepare a suspended slurry 2.

Subsequently, the prepared slurry 2 was casted to the substrate on which the upstream coating layer was formed from an end surface opposite of the end surface where the upstream coating layer was formed and the excess was blown off with a blower, and thus, the wall surface of the substrate was coated with the material and a precursor layer of a downstream coating layer was prepared. At this time, for the respective coating materials, with respect to 1 L of a capacity of a portion where the downstream coating layer was applied on the substrate, the contents of the respective coating materials were set in such a way that Material 6 became 0.25 g in a metal conversion of Rh (0.25 g/L-zone), Material 1 became 40 g (40 g/L-zone), Material 2 became 70 g (70 g/L-zone), Material 3 became 40 g (40 g/L-zone), and Material 4 became 30 g (30 g/L-zone). The coat length of the precursor layer of the downstream coating layer was adjusted to occupy 50% of the whole length of the substrate in the exhaust gas purification catalyst from an end portion in a downstream side with respect to the exhaust gas flow direction in the exhaust gas purification catalyst.

Finally, after the water content was reduced for two hours with a dryer kept at 120° C., firing was performed for two hours with an electric furnace kept at 500° C. to prepare the downstream coating layer (rear portion).

Subsequently, similarly to the above, Material 8 (Pd) and Material 2 (ACZ) were introduced into distilled water while being stirred, and the obtained suspension was dried at 120° C. for two hours and further fired at 500° C. for two hours to prepare ACZ on which Pd was supported (Pd/ACZ).

Next, Pd/ACZ, Material 1 ($Al_2O_3$), Material 4 (CZ), Material 5 (Ba), and $Al_2O_3$-based binder were introduced into distilled water while being stirred to prepare a suspended slurry 3.

Next, the prepared slurry 3 was casted to the substrate on which the downstream coating layer and the upstream coating layer that were a second catalyst coating layer were formed from the same end surface as the end surface where the upstream coating layer was formed and the excess was blown off with a blower, and thus, the wall surface of the substrate was coated with the material and a precursor layer of a first catalyst coating layer was prepared. At this time, for the respective coating materials, with respect to 1 L of the capacity of the portion where the first catalyst coating layer was applied on the substrate, the contents of the respective coating materials were set in such a way that Material 8 became 7 g in a metal conversion of Pd (7 g/L-zone), Material 1 became 25 g (25 g/L-zone), Material 2 became 75 g (75 g/L-zone), and Material 5 became 15 g (15 g/L-zone). The coat length of the precursor layer of the first catalyst coating layer was adjusted to occupy 30% of the whole length of the substrate in the exhaust gas purification catalyst from the end portion in the upstream side with respect to the exhaust gas flow direction in the exhaust gas purification catalyst.

Finally, after the water content was reduced for two hours with a dryer kept at 120° C., firing was performed for two hours with an electric furnace kept at 500° C. to prepare the first catalyst coating layer (front portion), and finally the exhaust gas purification catalyst was produced.

Comparative Example 2

An exhaust gas purification catalyst was produced similarly to Comparative Example 1 except that Material 3 (20 g/L) in the slurry 1 was changed to material 2 (20 g/L) (Rh/AZ→Rh/ACZ) in Comparative Example 1.

Example 1

An exhaust gas purification catalyst was produced similarly to Comparative Example 2 except that Material 6 was changed to Material 7 (Rh→particle size-controlled Rh) in Comparative Example 2.

Example 2

An exhaust gas purification catalyst was produced similarly to Example 1 except that the amount of Material 7 in the slurry 1 was changed to 0.17 g in a metal conversion of Rh (0.17 g/L-zone), and the amount of Material 7 in the slurry 2 was changed to 0.33 g in a metal conversion of Rh (0.33 g/L-zone) in Example 1.

Comparative Example 3

An exhaust gas purification catalyst was produced similarly to Comparative Example 1 except that Material 3 (40 g/L) in the slurry 2 was changed to Material 2 (40 g/L) (Rh/AZ→Rh/ACZ), Material 6 was changed to Material 7 (Rh→particle size-controlled Rh), the amount of Material 7 in the slurry 1 was changed to 0.17 g in a metal conversion of Rh (0.17 g/L-zone), and the amount of Material 7 in the slurry 2 was changed to 0.33 g in a metal conversion of Rh (0.33 g/L-zone) in Comparative Example 1.

Comparative Example 4

An exhaust gas purification catalyst was produced similarly to Comparative Example 1 except that Material 3 (20 g/L) in the slurry 1 was changed to Material 2 (20 g/L) (Rh/AZ→Rh/ACZ), Material 3 (40 g/L) in the slurry 2 was changed to Material 2 (40 g/L) (Rh/AZ→Rh/ACZ), Material 6 was changed to Material 7 (Rh→particle size-controlled Rh), the amount of Material 7 in the slurry 1 was changed to 0.17 g in a metal conversion of Rh (0.17 g/L-zone), and the amount of Material 7 in the slurry 2 was changed to 0.33 g in a metal conversion of Rh (0.33 g/L-zone) in Comparative Example 1.

Example 3

An exhaust gas purification catalyst was produced similarly to Example 2 except that the method for preparing the upstream coating layer was changed to a method below in Example 2.

(Upstream Coating Layer Preparation Method)

First, Material 7 (Rh) and Material 3 (AZ) were introduced into distilled water while being stirred, and the obtained suspension was dried at 120° C. for two hours and further fired at 500° C. for two hours to prepare AZ on which Rh was supported (Rh/AZ).

Next, Material 7 (Rh) and Material 2 (ACZ) were introduced into distilled water while being stirred, and the obtained suspension was dried at 120° C. for two hours and further fired at 500° C. for two hours to prepare AZ on which Rh was supported (Rh/ACZ).

Next, Rh/AZ, Rh/ACZ, Material 1 ($Al_2O_3$), Material 2 (ACZ), Material 4 (CZ), and $Al_2O_3$-based binder were introduced into distilled water while being stirred to prepare a suspended slurry 1.

Subsequently, the prepared slurry 1 was casted to the substrate and the excess was blown off with a blower, and thus, the wall surface of the substrate was coated with the material and a precursor layer of an upstream coating layer was prepared. At this time, for the respective coating materials, with respect to 1 L of a capacity of a portion where the upstream coating layer was applied on the substrate, the contents of the respective coating materials were set in such a way that Material 7 became 0.17 g in a metal conversion of Rh (0.17 g/L-zone), here, 20% (0.034 g/L-zone) of Rh was supported on Material 2 and 80% (0.136 g/L-zone) of Rh was supported on Material 3, Material 1 became 20 g (20 g/L-zone), Material 2 became 44 g (44 g/L-zone), here, Material 2 on which Rh was supported became 4 g (4 g/L-zone), Material 3 became 16 g (16 g/L-zone), and Material 4 became 10 g (10 g/L-zone). The coat length of the precursor layer of the upstream coating layer was adjusted to occupy 50% of the whole length of the substrate in an exhaust gas purification catalyst from an end portion in an upstream side with respect to an exhaust gas flow direction in the exhaust gas purification catalyst.

Finally, after the water content was reduced for two hours with a dryer kept at 120° C., firing was performed for two hours with an electric furnace kept at 500° C. to prepare the upstream coating layer (front portion).

Example 4

An exhaust gas purification catalyst was produced similarly to Example 3 except that in the preparation of the upstream coating layer of Example 3, 50% (0.085 g/L-zone) of Rh was supported on Material 2, 50% (0.085 g/L-zone) of Rh was supported on Material 3, the amount of Material 2 was changed to 50 g (50 g/L-zone), here, the amount of Material 2 on which Rh was supported was changed to 10 g (10 g/L-zone), and the amount of Material 3 was changed to 10 g (10 g/L-zone).

Example 5

An exhaust gas purification catalyst was produced similarly to Example 1 except that the amount of Material 7 in the slurry 1 was changed to 0.10 g in a metal conversion of Rh (0.10 g/L-zone), and the amount of Material 7 in the slurry 2 was changed to 0.40 g in a metal conversion of Rh (0.40 g/L-zone) in Example 1.

Table 1 summarizes the catalyst compositions of the upstream coating layers and the downstream coating layers in the exhaust gas purification catalysts of Comparative Examples 1 to 4 and Examples 1 to 5.

TABLE 1

List of Catalyst Composition

| | Upstream Coating Layer | | | Downstream Coating Layer | | |
|---|---|---|---|---|---|---|
| | Rh Type | Rh Concentration | Support Position | Rh Type | Rh Concentration | Support Position |
| Comparative Example 1 | Rh Nitrate | 0.25 g/L-z | AZ | Rh Nitrate | 0.25 g/L-z | AZ |
| Comparative Example 2 | Rh Nitrate | 0.25 g/L-z | ACZ | Rh Nitrate | 0.25 g/L-z | AZ |
| Comparative Example 3 | Particle Size-Controlled Rh | 0.17 g/L-z | AZ | Particle Size-Controlled Rh | 0.33 g/L-z | ACZ |
| Comparative Example 4 | Particle Size-Controlled Rh | 0.17 g/L-z | ACZ | Particle Size-Controlled Rh | 0.33 g/L-Z | ACZ |
| Example 1 | Particle Size-Controlled Rh | 0.25 g/L-z | ACZ | Particle Size-Controlled Rh | 0.25 g/L-z | AZ |
| Example 2 | Particle Size-Controlled Rh | 0.17 g/L-z | ACZ | Particle Size-Controlled Rh | 0.33 g/L-z | AZ |
| Example 3 | Particle Size-Controlled Rh | 0.17 g/L-z | 20%: ACZ 80%: AZ | Particle Size-Controlled Rh | 0.33 g/L-z | AZ |
| Example 4 | Particle Size-Controlled Rh | 0.17 g/L-z | 50%: ACZ 50%: AZ | Particle Size-Controlled Rh | 0.33 g/L-z | AZ |
| Example 5 | Particle Size-Controlled Rh | 0.10 g/L-z | ACZ | Particle Size-Controlled Rh | 0.40 g/L-z | AZ |

3. Durability Test

The following durability test was performed using an actual engine for the exhaust gas purification catalysts of Comparative Examples 1 to 4 and Examples 1 to 5.

The test was performed by mounting each of the exhaust gas purification catalysts on the exhaust system of a V8 engine and repeatedly flowing exhaust gases in respective atmospheres of stoichiometric and lean at each certain period of time (ratio of 3:1) at a catalyst bed temperature of 950° C. and over 50 hours.

4. Performance Evaluation

The following performance evaluations were performed using actual engines for the exhaust gas purification catalysts of Comparative Examples 1 to 4 and Examples 1 to 5 that have undergone 3. Durability Test.

4-1. OSC Evaluation

Each of the exhaust gas purification catalysts was mounted on the exhaust system of an L4 engine, and an A/F feedback control was performed such that the A/F became 14.4 and 15.1 under conditions of Ga=10 g/s and 500° C. (low temperature). From the difference between a stoichiometric point and an A/F sensor output, an excess or shortage of oxygen was calculated from the following formula, and the maximum oxygen storage amount at Ga=10 g/s and 500° C. (low temperature) was evaluated as OSC.

$$\text{OSC (g)}=0.23\times\Delta A/F\times\text{injected fuel amount}$$

The larger the OSC value is, the more an A/F variation of an engine output gas can be absorbed, thus an atmosphere inside the exhaust gas purification catalyst can be held around a stoichiometric state and a high purification performance can be maintained.

4-2. NOx Conversion Rate in Rich Atmosphere

Each of the exhaust gas purification catalysts was mounted on the exhaust system of an L4 engine, an exhaust gas with an air-fuel ratio (A/F) of 14.4 was supplied, and a NOx conversion rate at Ga=30/s and 550° C. was measured. The NOx conversion rate at a three-minute duration was evaluated as a NOx conversion activity in a rich atmosphere.

5. Evaluation Result

Figure 2:
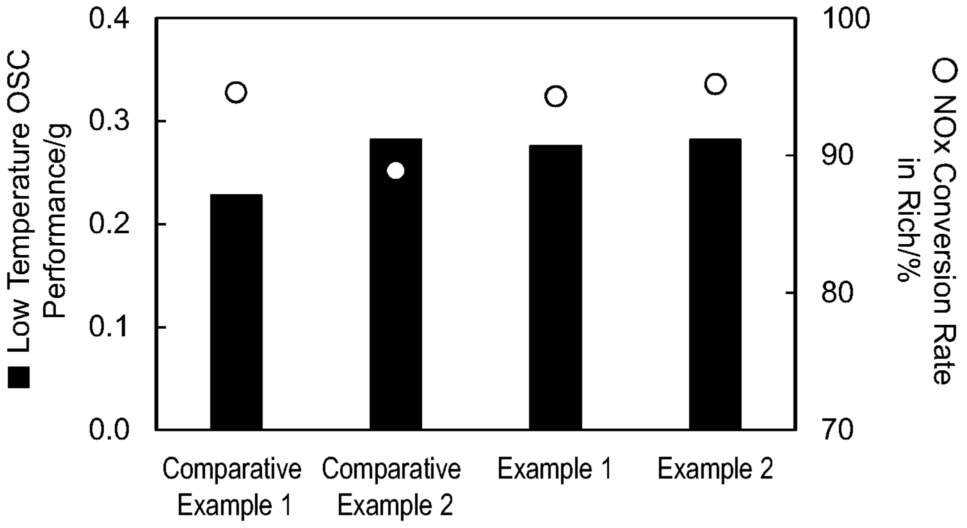
FIG. 2 is a graph illustrating an OSC performance at low temperature and an NOx conversion rate in a rich atmosphere of Comparative Examples 1 and 2 and Examples 1 and 2.

Table 2 and FIG. 2 show the results.

TABLE 2

List of Evaluation Result

| | Low Temperature OSC/g | NOx Conversion Rate in Rich (%) |
|---|---|---|
| Comparative Example 1 | 0.228 | 94.6 |
| Comparative Example 2 | 0.282 | 88.9 |
| Example 1 | 0.276 | 94.3 |
| Example 2 | 0.282 | 95.2 |
| Comparative Example 3 | 0.303 | 92.1 |
| Comparative Example 4 | 0.325 | 92.2 |
| Example 3 | 0.252 | 94.9 |
| Example 4 | 0.268 | 94.6 |
| Example 5 | 0.245 | 95.0 |

The difference between Comparative Examples 1 and 2 is only that the support position (carrier particles) of Rh in the upstream coating layer is AZ in Comparative Example 1 and ACZ in Comparative Example 2. In Comparative Example 1, Rh is supported on AZ. Because of this, the NOx conversion rate in the rich atmosphere is high while the OSC performance at low temperature is low. Meanwhile, in Comparative Example 2, Rh is supported on ACZ (OSC material). Because of this, the OSC performance at low temperature is high while the NOx conversion rate in the rich atmosphere becomes low. Accordingly, by the comparison of Comparative Examples 1 and 2, it has been found that the OSC performance at low temperature and the NOx conversion rate under the rich atmosphere are in a relation of trade-off.

The difference between Comparative Example 2 and Example 1 is only that Rh in the second catalyst coating layer of Comparative Example 2 is changed to particle size-controlled Rh in Example 1. Accordingly, by the comparison of Comparative Examples 1 and 2, and Example 1, it has been found that the combination of particle size-controlled Rh and ACZ (particle size-controlled Rh/ACZ) enables improving the OSC performance at low temperature while maintaining the NOx conversion rate under the rich atmosphere.

The difference among Examples 1, 2, and 5 is only that the weight ratio of Rh between the upstream coating layer and the downstream coating layer (Rh amount in upstream coating layer:Rh amount in downstream coating layer) is 1:1 in Example 1, 1:2 in Example 2, and 1:4 in Example 5. Accordingly, by the comparison of Examples 1, 2, and 5, it has been found that even when the Rh amount in the downstream coating layer is made higher than the Rh amount in the upstream coating layer, the NOx conversion rate under the rich atmosphere can be improved while maintaining the OSC performance at low temperature.

The difference between Example 2 and Comparative Example 3 is only that the support positions (carrier particles) of Rh in the second catalyst coating layer are reversed. By the comparison of Example 2 and Comparative Example 3, it has been found that when ACZ is used as carrier particles of Rh in the downstream coating layer, the OSC performance at low temperature is improved while the NOx conversion rate under the rich atmosphere decreases. This is inferred as follows. In Comparative Example 3, since CO that also acts as a reductant is consumed in the upstream coating layer, the amount of CO entering the downstream coating layer decreases. Accordingly, Rh present in the downstream coating layer is less likely to be reduced compared with Rh present in the upstream coating layer. Consequently, it is considered that even when particle size-controlled Rh is used as Rh, the NOx conversion rate under the rich atmosphere is lowered.

Furthermore, from Examples 2, 3, and 4, for Rh in the upstream coating layer, it has been found that even when Rh present in the upstream coating layer is not supported on ACZ by 100%, supporting Rh present in the upstream coating layer on ACZ by 20% provides the effect of the present disclosure.

All publications, patents and patent applications cited in the present description are herein incorporated by reference as they are.

What is claimed is:

1. An exhaust gas purification catalyst comprising:

a substrate; and a catalyst coating layer coated on the substrate, wherein the catalyst coating layer includes a first catalyst coating layer containing Pd and/or Pt as a catalyst metal and a second catalyst coating layer containing Rh as a catalyst metal, wherein the first catalyst coating layer is formed from an end portion in an upstream side with respect to an exhaust gas flow direction in the exhaust gas purification catalyst, wherein the second catalyst coating layer includes an upstream coating layer and a downstream coating layer, the upstream coating layer being formed from the end portion in the upstream side with respect to the exhaust gas flow direction in the exhaust gas purification catalyst, the downstream coating layer being formed from an end portion in a downstream side with respect to the exhaust gas flow direction in the exhaust gas purification catalyst, wherein the upstream coating layer includes particles in which Rh is supported on an oxygen storage capacity material, a support amount of Rh on the oxygen storage capacity material is 20 weight % or more relative to a total weight of the whole of Rh present in the upstream coating layer, wherein the downstream coating layer includes particles in which Rh is supported on a $ZrO_2$-containing composite oxide selected from an alumina-zirconia-based composite oxide (AZ), and an alumina-zirconia-titanium-based composite oxide (AZT), and wherein a mean particle diameter of Rh is 1.0 nm to 2.0 nm with a standard deviation σ of 0.8 nm or less in a measurement by a transmission electron microscope observation.

2. The exhaust gas purification catalyst according to claim 1, wherein a weight ratio of Rh between the upstream coating layer and the downstream coating layer (Rh amount in upstream coating layer:Rh amount in downstream coating layer) is from 1:1 to 1:4.

3. The exhaust gas purification catalyst according to claim 2, wherein the upstream coating layer and the downstream coating layer have mutually overlapping regions.

4. The exhaust gas purification catalyst according to claim 1, wherein the upstream coating layer and the downstream coating layer have mutually overlapping regions.

* * * * *